US008233159B2

(12) United States Patent
Ohmiya

(10) Patent No.: US 8,233,159 B2
(45) Date of Patent: Jul. 31, 2012

(54) IMAGE FORMING DEVICE, AND METHOD AND COMPUTER READABLE MEDIUM THEREFOR

(75) Inventor: Takashi Ohmiya, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 886 days.

(21) Appl. No.: 12/241,271

(22) Filed: Sep. 30, 2008

(65) Prior Publication Data

US 2009/0086236 A1 Apr. 2, 2009

(30) Foreign Application Priority Data

Oct. 1, 2007 (JP) ................................ 2007-257657

(51) Int. Cl.
*G06K 15/00* (2006.01)

(52) U.S. Cl. .......... 358/1.12; 358/1.18; 347/19; 399/51; 400/279; 400/283; 430/30

(58) Field of Classification Search ................. 358/1.12, 358/518; 430/30; 399/51; 400/19, 74, 279, 400/283

See application file for complete search history.

(56) References Cited

U.S. PATENT DOCUMENTS

| | | | | |
|---|---|---|---|---|
| 5,600,404 | A | 2/1997 | Ando et al. | |
| 6,021,288 | A | 2/2000 | Okuno et al. | |
| 6,267,519 | B1 * | 7/2001 | Otsuki et al. | 400/279 |
| 6,297,873 | B1 | 10/2001 | Furuya | |
| 6,330,404 | B1 | 12/2001 | Munenaka et al. | |
| 6,418,295 | B1 * | 7/2002 | Sato | 399/301 |
| 6,700,593 | B2 * | 3/2004 | Otsuki | 347/19 |
| 2002/0113984 | A1 | 8/2002 | Nakajima et al. | |
| 2002/0136570 | A1 | 9/2002 | Yamanaka et al. | |
| 2004/0033090 | A1 | 2/2004 | Yamanaka et al. | |
| 2004/0179727 | A1 * | 9/2004 | Takeuchi | 382/145 |
| 2005/0212887 | A1 | 9/2005 | Tanaka et al. | |
| 2007/0230976 | A1 * | 10/2007 | Takahashi | 399/35 |

(Continued)

FOREIGN PATENT DOCUMENTS

JP 08-044134 2/1996

(Continued)

OTHER PUBLICATIONS

English Machine Translation of JP-H10-148992 (Murakami et al., published Jun. 2, 1998).*

(Continued)

*Primary Examiner* — Benny Q Tieu
*Assistant Examiner* — Juan Guillermety
(74) *Attorney, Agent, or Firm* — Banner & Witcoff, Ltd.

(57) ABSTRACT

An image forming device includes a sheet carrying body carrying a sheet thereon in a predetermined direction, a pattern selecting unit selecting one of a plurality of patterns that includes a first pattern and a second pattern, the first pattern including a plurality of marks aligned at intervals of a predetermined distance within a first range, the second pattern including a plurality of marks aligned at intervals of a predetermined distance within a second range shorter than the first range, a forming unit configured to form the selected pattern on the sheet carrying body and form an image on the sheet being carried on the sheet carrying body, a deviation determining unit determining a positional deviation of the image based upon the pattern formed, and a correcting unit performing positional deviation correction for the image to be formed on the sheet based upon the positional deviation determined.

18 Claims, 6 Drawing Sheets

U.S. PATENT DOCUMENTS

2008/0043299 A1 * 2/2008 Ikeda ............................ 358/518

FOREIGN PATENT DOCUMENTS

| | | |
|---|---|---|
| JP | 08-118737 | 5/1996 |
| JP | 10-148992 | 6/1998 |
| JP | 2000-194176 | 7/2000 |
| JP | 2000-356875 | 12/2000 |
| JP | 2002-207338 | 7/2002 |
| JP | 2004-012549 | 1/2004 |
| JP | 2004-294846 | 10/2004 |
| JP | 2005-202284 | 7/2005 |
| JP | 2007-065262 | 3/2007 |

OTHER PUBLICATIONS

European Search Report received for counterpart EP application No. 08 01 4515, mailed Mar. 3, 2010.

Notification of Reasons of Rejection for Japanese Application No. 2007-257657, mailed on Sep. 8, 2009.

* cited by examiner

IMAGE FORMING DEVICE, AND METHOD AND COMPUTER READABLE MEDIUM THEREFOR

CROSS-REFERENCE TO RELATED APPLICATION

This application claims priority under 35 U.S.C. §119 from Japanese Patent Application No. 2007-257657 filed on Oct. 1, 2007. The entire subject matter of the application is incorporated herein by reference.

BACKGROUND

1. Technical Field

The following description relates to one or more techniques to correct a positional deviation of an image to be formed by an image forming device.

2. Related Art

An image forming device such as a color laser printer has been known, which includes a plurality of image forming units aligned along a sheet carrying belt such that toner images of respective different colors are sequentially transferred onto a sheet being conveyed on the sheet carrying belt by the image forming units. In such an image forming device, when the respective toner images are transferred in different positions on the sheet by the image forming units, an image is formed as a low-quality one.

In order to ensure the quality of the image, a technique referred to as registration to correct positional deviations between the toner images transferred onto the sheet has been employed (for example, see Japanese Patent Provisional Publication No. HEI8-118737). According to such a correction technique, a pattern that includes a plurality of marks is formed on a surface of the sheet carrying belt by each image forming unit, and the positional deviations between different color toner images are measured by detecting locations of the marks with an optical sensor. Then, based upon a result of the detection, the positional deviations between the toner images are corrected. It is noted that the measured deviations may periodically fluctuate due to unevenness in thickness of the sheet carrying belt. In general, the patterns are formed throughout a circuit of the sheet carrying belt. The positional deviations of the marks included in the pattern are measured in a plurality of locations on the sheet carrying belt, and the positional deviation correction is performed based upon an average value of the measured deviations.

SUMMARY

However, in the known technique, the pattern formed in the positional deviation correction is always constant, and an identical process is regularly performed for the correction. Therefore, a time period taken for the process is also constant. Thus, for instance, even though a user wishes to rapidly carry out printing, the user has to wait for the constant time period after the correction once begins until the correction is completed. Namely, unfortunately, the known technique cannot flexibly meet user's requirements.

Aspects of the present invention are advantageous to provide one or more improved image forming devices, methods, and computer readable media that make it possible to change an operation mode of positional deviation correction depending on a situation.

According to aspects of the present invention, an image forming device is provided, which includes a sheet carrying body configured to carry a sheet thereon in a predetermined direction, a pattern selecting unit configured to select one of a plurality of kinds of patterns, the plurality kinds of patterns including a first pattern and a second pattern, the first pattern including a plurality of marks aligned at intervals of a predetermined distance within a first range, the second pattern including a plurality of marks aligned at intervals of a predetermined distance within a second range shorter than the first range, a forming unit configured to form the pattern selected by the pattern selecting unit on the sheet carrying body and to form an image on the sheet being carried on the sheet carrying body, a deviation determining unit configured to determine a positional deviation of the image to be formed on the sheet by the forming unit, based upon the pattern formed on the sheet carrying body by the forming unit, and a correcting unit configured to perform positional deviation correction for the image to be formed on the sheet based upon the positional deviation determined by the deviation determining unit.

In some aspects, a pattern selected from a plurality of kinds of patterns is formed on the sheet carrying body, and a positional deviation of an image forming position is determined based upon the pattern formed. Then, the positional deviation correction is performed based upon the positional deviation determined. Thereby, it is possible to change an operational mode of the positional deviation correction depending on a situation. Specifically, for example, when the plurality of kinds of patterns include a first pattern to attain highly accurate correction and a second pattern to attain short-time correction, the first pattern can be employed to secure image quality, or the second pattern can be selected to give priority to a speed of the correction.

According to aspects of the present invention, further provided is a method to correct a positional deviation of an image to be formed by an image forming device that includes a sheet carrying body configured to carry a sheet thereon in a predetermined direction. The method includes a pattern selecting step of selecting one of a plurality of kinds of patterns, the plurality kinds of patterns including a first pattern and a second pattern, the first pattern including a plurality of marks aligned at intervals of a predetermined distance within a first range, the second pattern including a plurality of marks aligned at intervals of a predetermined distance within a second range shorter than the first range, a forming step of forming the pattern selected in the pattern selecting step on the sheet carrying body, a deviation determining step of determining a positional deviation of the image to be formed on the sheet, based upon the pattern formed on the sheet carrying body in the forming step, and a correcting step of performing positional deviation correction for the image to be formed on the sheet based upon the positional deviation determined in the deviation determining step.

In the method configured as above, the same effect as the aforementioned image forming device can be provided.

According to aspects of the present invention, further provided is a computer readable medium having computer executable instructions stored thereon. The instructions causes an image forming device, which includes a sheet carrying body configured to carry a sheet thereon in a predetermined direction, to perform a pattern selecting step of selecting one of a plurality of kinds of patterns, the plurality kinds of patterns including a first pattern and a second pattern, the first pattern including a plurality of marks aligned at intervals of a predetermined distance within a first range, the second pattern including a plurality of marks aligned at intervals of a predetermined distance within a second range shorter than the first range, a forming step of forming the pattern selected in the pattern selecting step on the sheet carrying body, a deviation determining step of determining a positional deviation of an image to be formed on the sheet, based upon the pattern formed on the sheet carrying body in the forming step, and a correcting step of performing positional deviation correction for the image to be formed on the sheet based upon the positional deviation determined in the deviation determining step.

In the computer readable medium configured as above, the same effect as the aforementioned image forming device can be provided.

BRIEF DESCRIPTION OF THE ACCOMPANYING DRAWINGS

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

Hereinafter, an embodiment according to aspects of the present invention will be described with reference to the accompany drawings.

(Overall Configuration of Printer)

Figure 1:
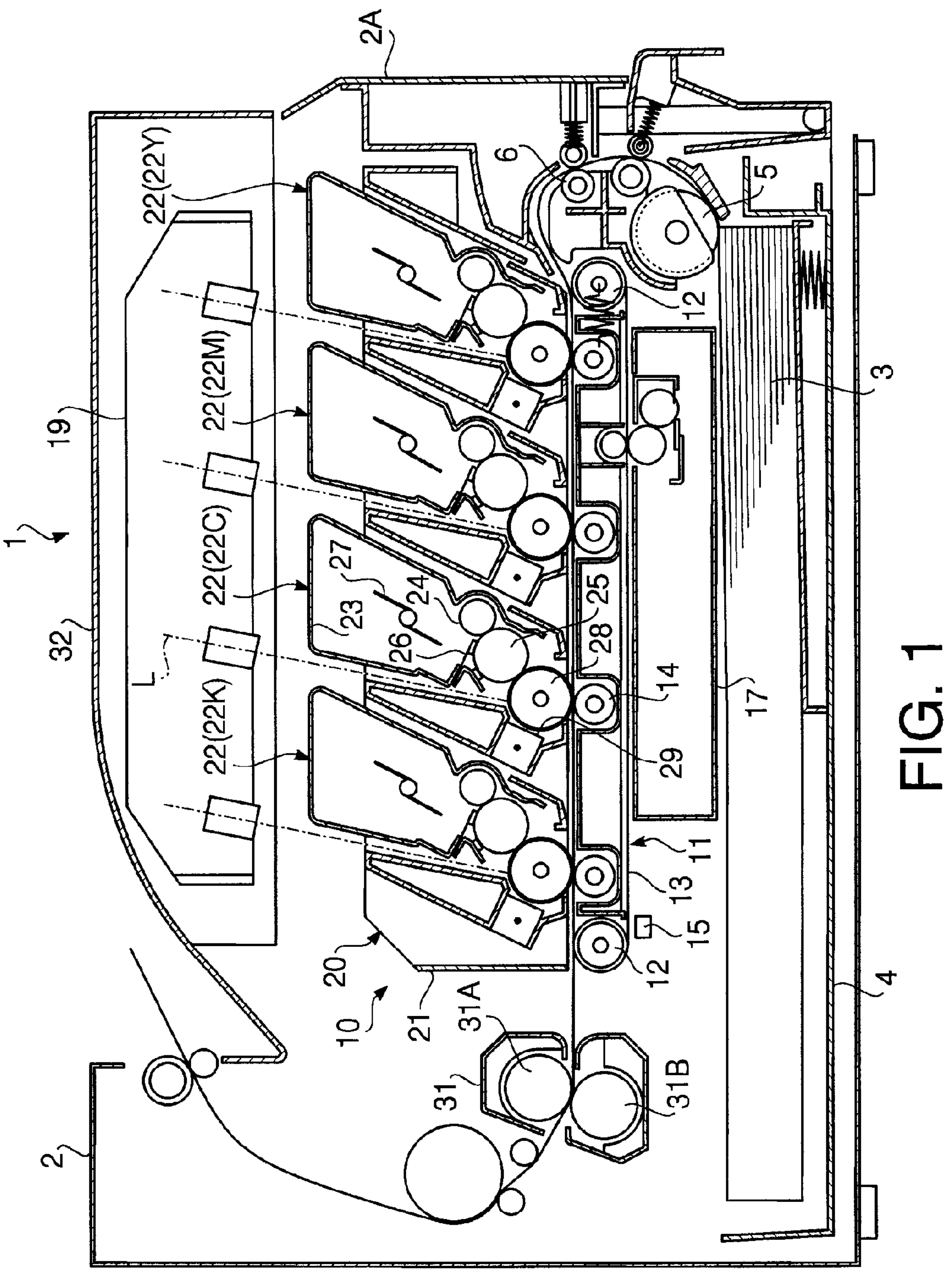
FIG. 1 is a cross-sectional side view schematically showing a configuration of a printer as an image forming device in an embodiment according to one or more aspects of the present invention.

FIG. 1 is a cross-sectional side view schematically showing a configuration of a printer 1 according to aspects of the present invention. It is noted that the following description will be given under an assumption that a right side of FIG. 1 is defined as a front side of the printer 1.

The printer 1 is provided with a casing 2. At a bottom of the casing 2, a sheet feed tray 4 is provided, which is configured to be loaded with one or more sheets 3 as recording media. On an upper front side of the sheet feed tray 4, a sheet feed roller 5 is provided. Along with rotation of the sheet feed roller 5, a top sheet 3 placed in the sheet feed tray 4 is conveyed to a registration roller 6. After skew correction of the sheet 3, the registration roller 6 carries the sheet 3 onto a belt unit 11 of an image forming unit 10.

The image forming unit 10 includes the belt unit 11, a scanner unit 19, a process unit 20, and a fixing unit 31.

The belt unit 11 is configured with a belt 13 made of polycarbonate being strained around a pair of front and rear belt supporting rollers 12. When the rear belt supporting roller 12 is driven and rotated, the belt 13 is revolved in a counterclockwise direction, and the sheet 3 on the belt 13 is conveyed backward. Further, inside the belt 13, transfer rollers 14 are provided to face respective photoconductive drums 28 of the process unit 20 via the belt 13.

Additionally, a pair of pattern detecting sensors 15, configured to detect a pattern formed on the belt 13, is provided to face a lower side surface of the belt 13. The pattern detecting sensors 15 are configured to emit light onto the surface of the belt 13, receive the light reflected by the surface of the belt 13 with a phototransistor, and output a signal of a level corresponding to an intensity of the received light. Further, at a lower side of the belt unit 11, a cleaning unit 17 is provided, which is configured to collect toner and/or paper dusts adhered to the surface of the belt 13.

The scanner unit 19 is configured to illuminate a surface of each photoconductive drum 28 with a laser beam emitted by a laser emitting unit (not shown) corresponding to each color.

The process unit 20 includes a frame 21 and development cartridges 22 (22Y, 22M, 22C, and 22K) corresponding to respective four colors (yellow, magenta, cyan, and black), which cartridges are detachably attached to four cartridge attachment portions provided to the frame, respectively. It is noted that the process unit 20 is configured to be drawn forth when a front cover 2A provided at a front of the casing 2 is opened. Further, in a state where the process unit 20 is detached from the casing 2, the belt unit 11 and the cleaning unit 17 can be attached to and detached from the casing 2. At a lower side of the frame 21, a photoconductive drum 28, of which a surface is covered with a photoconductive layer having a property to be positively charged, and a scorotron type charger 29 are provided to correspond to each development cartridge 22.

Each development cartridge 22 includes, at an upper side in a box-shaped casing, a toner container 23 configured to store therein toner as developer of each color. Further, each development cartridge 22 includes, under the toner container 23, a supply roller 24, a development roller 25, a layer thickness controlling blade 26, and an agitator 27. Some toner in the toner container 23 is supplied to the development roller 25 through rotation of the supply roller 24 and positively charged through friction between the supply roller 24 and the development roller 25. Further, the toner supplied onto the development roller 25 is introduced into between the layer thickness controlling blade 26 and the development roller 25 through rotation of the development roller 25. Then, the toner is sufficiently charged due to friction here and held on the development roller 25 as a thin layer with a constant thickness.

In an image forming operation, the photoconductive drum 28 is rotated, and thereby the surface of the photoconductive drum 28 is evenly and positively charged by the charger 29. Then, the positively charged surface is exposed through fast scanning with the laser beam emitted by the scanner unit 19, and an electrostatic latent image corresponding to an image to be formed on the sheet 3 is formed on the surface of the photoconductive drum 28.

Subsequently, when contacting the photoconductive drum 28 through the rotation of the development roller 25, the positively charged toner held on the development roller 25 is supplied to the electrostatic latent image formed on the surface of the photoconductive drum 28. Thereby, a toner image formed with the toner adhered to the exposed portions thereon is held on the surface of the photoconductive drum 28, and thus the electrostatic latent image on the photoconductive drum 28 is visualized.

After that, the toner image held on the surface of each photoconductive drum 28 is sequentially transferred onto the sheet 3 by a negative transfer voltage applied to the transfer roller 14 while the sheet 3 conveyed on the belt 13 passes through a transfer position between the photoconductive drum 28 and the transfer roller 14. Then, the sheet 3 with the toner image thus transferred thereon is conveyed to the fixing unit 31.

The fixing unit 31 includes a heating roller 31A having a heating source and a pressing roller 31B configured to press the sheet 3 against the heating roller 31A. The fixing unit 31 is configured to thermally fix the toner image transferred onto the sheet 3. Then, the sheet 3 with the toner image fixed thereon is conveyed upward and discharged onto a catch tray 32 provided on an upper face of the casing 2.

(Electrical Configuration)

Figure 2:
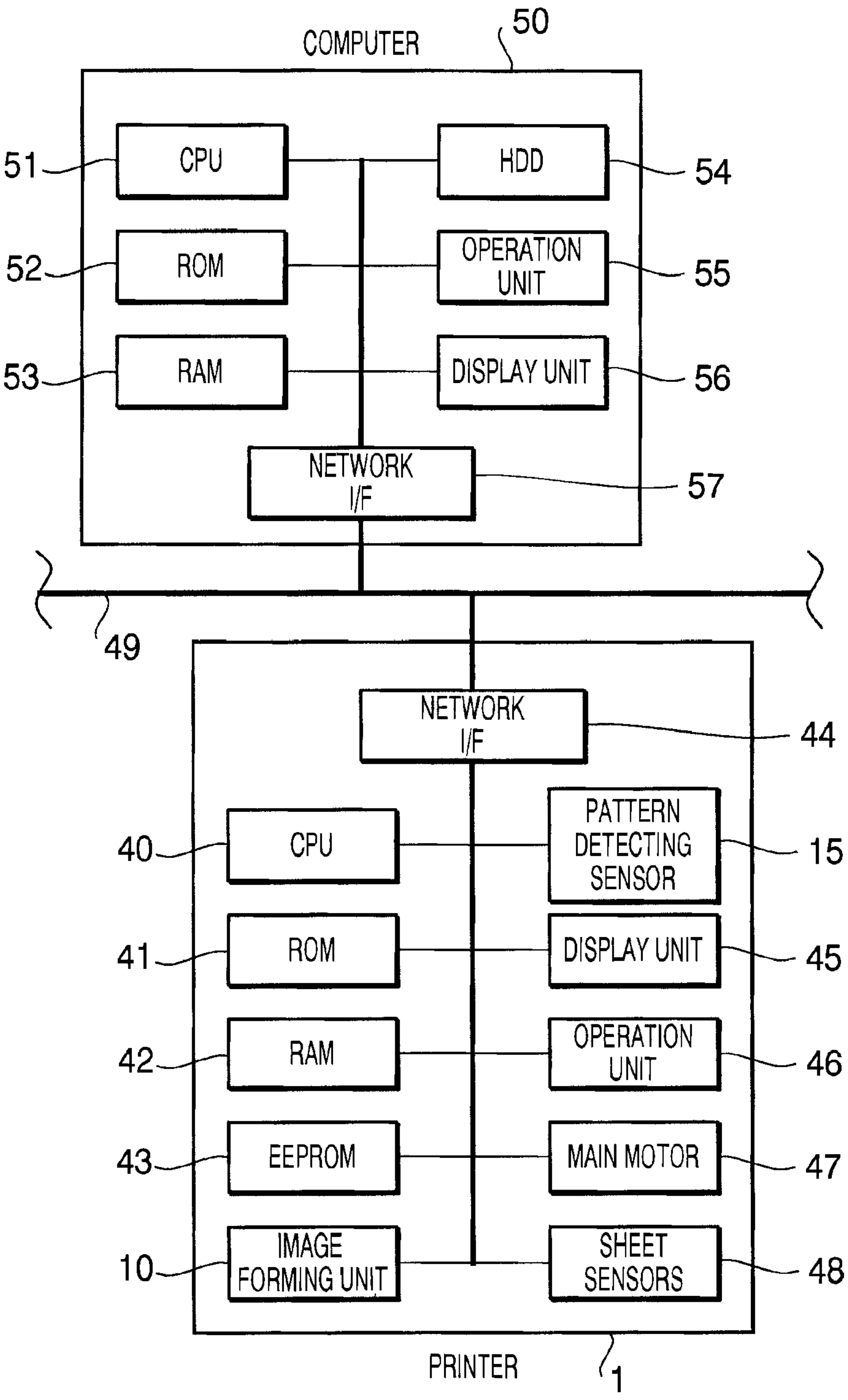
FIG. 2 is a block diagram showing electrical configurations of the printer and a computer in the embodiment according to one or more aspects of the present invention.

FIG. 2 is a block diagram showing electrical configurations of the printer 1 and a computer 50 connected with the printer 1 via a network.

As shown in FIG. 2, the printer 1 includes a CPU 40, a ROM 41, a RAM 42, an EEPROM 43, and a network interface 44, which are connected with the image forming unit 10, the pattern detecting sensors 15, a display unit 45, an operation unit 46, a main motor 47, and a plurality of sheet sensors 48.

The ROM 41 stores thereon programs for executing various operations of the printer 1 such as a below-mentioned printing process and positional deviation correcting process. The CPU 40 controls each element in accordance with a program read out from the ROM 41 while saving processing results onto the RAM 42 or the EEPROM 43. The network interface 44 is linked with the external computer 50 via a communication line 49 to attain mutual data communication therebetween.

The display unit 45 is provided with a liquid crystal display (LCD) and lamps and configured to display various setting screens and an operational status of the printer 1. The operation unit 46 is provided with buttons and configured to accept various user inputs through the buttons.

The main motor 47 is configured to rotate the registration roller 6, the belt supporting rollers 12, the transfer rollers 14, the development rollers 25, the photoconductive drums 28, and the heating roller 31A while synchronizing them. The sheet sensors 48 are disposed in a plurality of positions on a carrying route of the sheet 3 and configured to detect whether the sheet 3 is present in the respective positions.

The computer 50 is provided with a CPU 51, a ROM 52, a RAM 53, a hard disk drive (HDD) 54, an operation unit 55 including a keyboard and a pointing device, a display unit 56 including a liquid crystal display (LCD) and a network interface 57 linked with the communication line 49. The HDD stores thereon various programs such as a printer driver and application software for creating image data to be printed.

(Printing Process)

Figure 3:
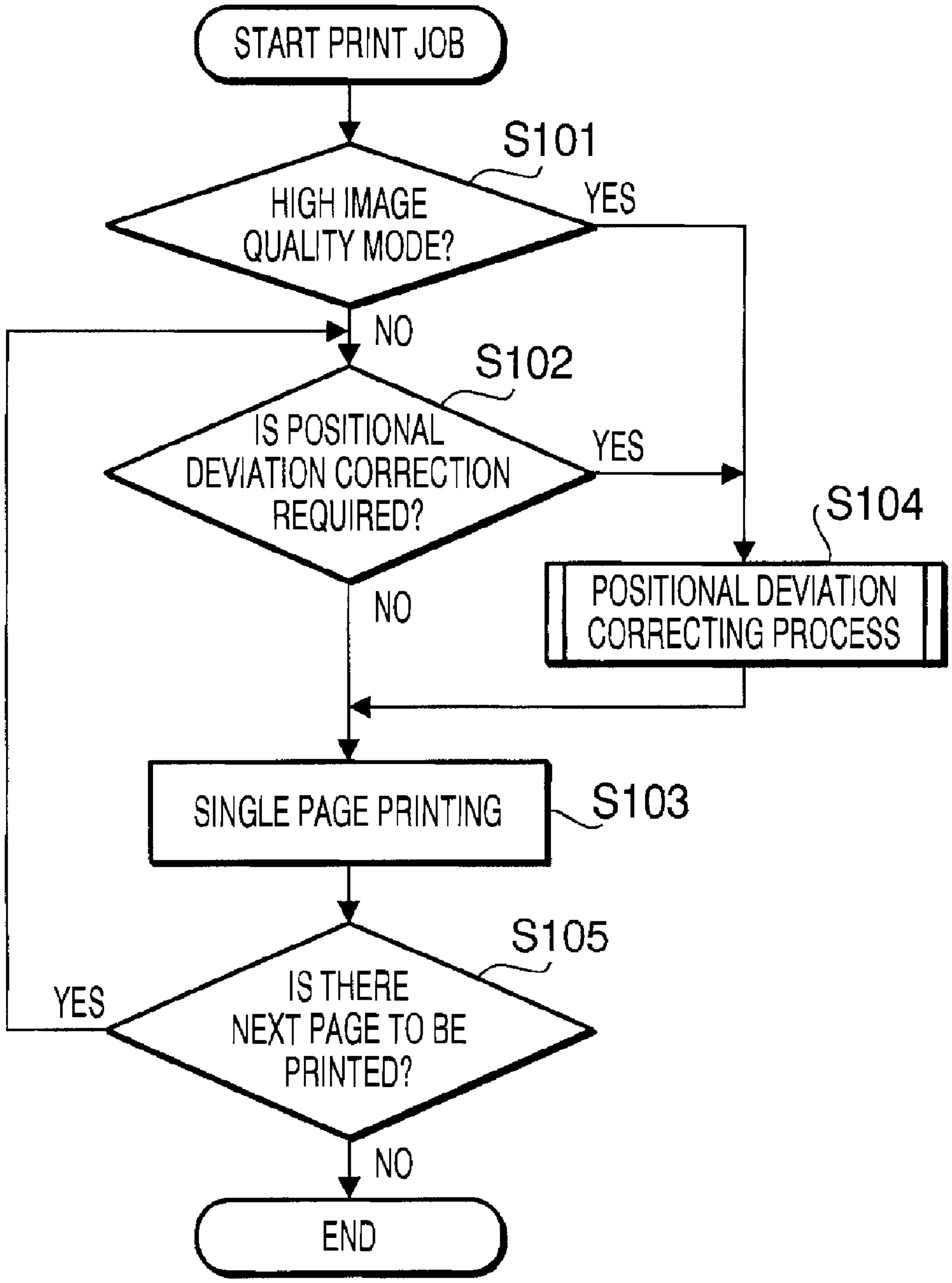
FIG. 3 is a flowchart showing a procedure of a printing process in the embodiment according to one or more aspects of the present invention.

Next, a printing process to be executed by the printer 1 will be described. FIG. 3 is a flowchart showing a procedure of the printing process.

Firstly, when a user inputs a print command to instruct to print image data through the operation unit 55, the CPU 51 launches the printer driver and displays a setting screen on the display unit 56. Then, when the user configures various print settings through the operation unit 55, the CPU 51 loads intended image data and converts the image data into page description language (PDL) data. Thereafter, the CPU 51 creates print data obtained by adding the print command and the print settings to the PDL data and transmits the print data to the printer 1. It is noted that setting items of the print settings includes print quality, the number of copies, and a setting of a fast mode described below.

When the print data is inputted into the printer 1 from the external computer 50 via the network interface 44, the CPU 40 stores the print data on the RAM 42 and registers processing of the print data as a print job. Then, when launching the processing of the print job, as shown in FIG. 3, the CPU 40 determines whether a high image quality mode is active in the print settings (S101). When a high image quality mode is not active (S101: No), it is determined whether the positional deviation correcting process has to be performed (S102). In this step, for example, when printing has been performed for a predetermined number of pages since previous positional deviation correcting process, or occurrence of paper is detected, it is determined that the positional deviation correcting process has to be performed. It is noted that the CPU 40 determines that paper jam is caused, when the sheet 3 is not detected by each sheet sensor 48 at a predetermined timing while the sheet 3 is being conveyed.

When it is determined that the positional deviation correcting process does not have to be performed (S102: No), a page of the print job is printed by the image forming unit 10 (S103). Meanwhile, when it is determined that the positional deviation correcting process has to be performed (S102: Yes), or the high image quality mode is active (S101: Yes), the below-mentioned positional deviation correcting process is performed (S104). Thereafter, in S103, a page of the print job is printed.

Subsequently, the CPU 40 determines whether there is a next page to be printed (S105). When it is determined that there is a next page to be printed (S105: Yes), the present process goes back to S102, in which it is determined whether the positional deviation correcting process has to be performed. When all pages included in the print job are printed (S105: No), the present process is terminated.

(Positional Difference Correcting Process)

Figure 4:
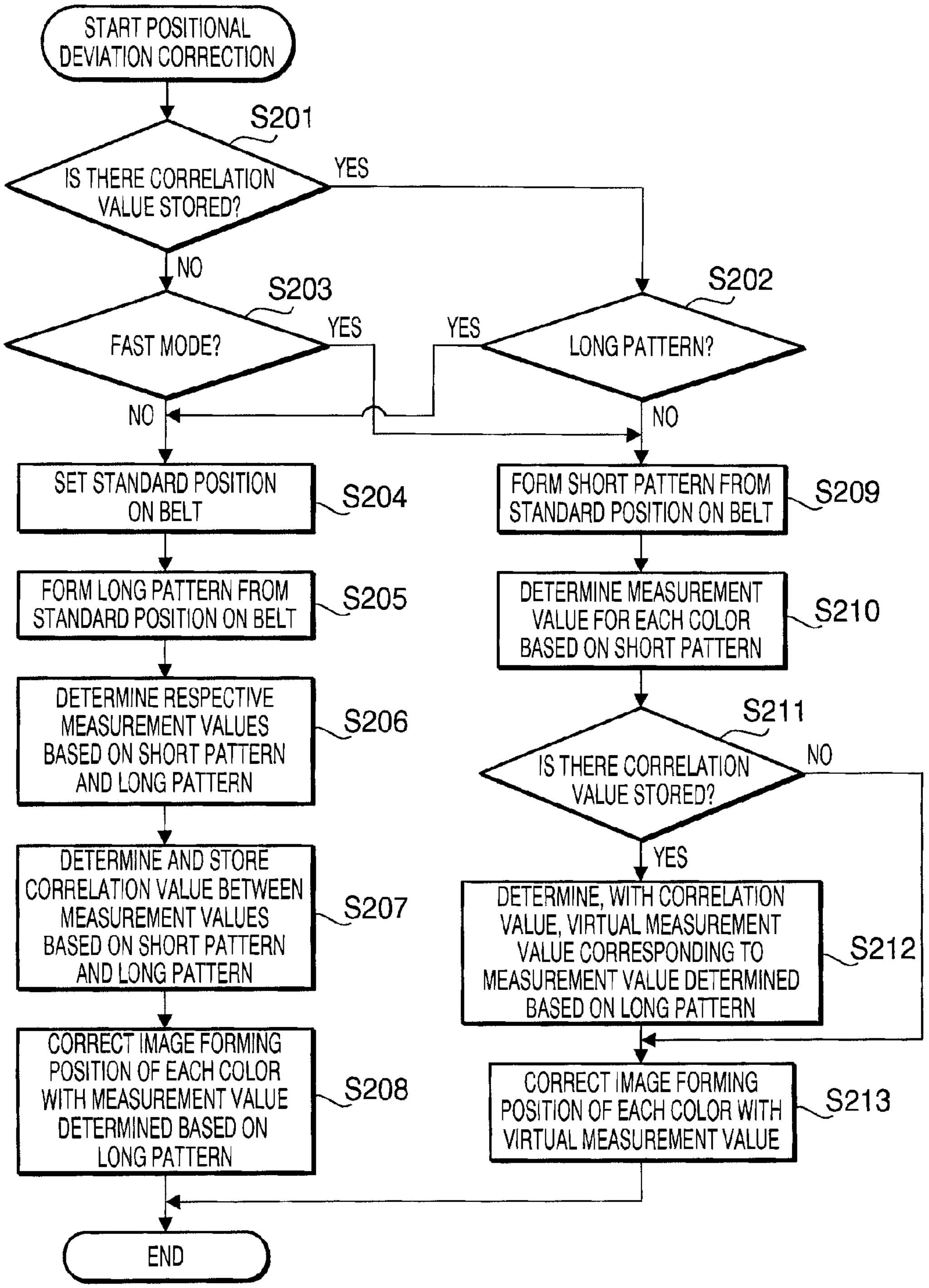
FIG. 4 is a flowchart showing a procedure of a positional deviation correcting process in the embodiment according to one or more aspects of the present invention.
Figure 5:
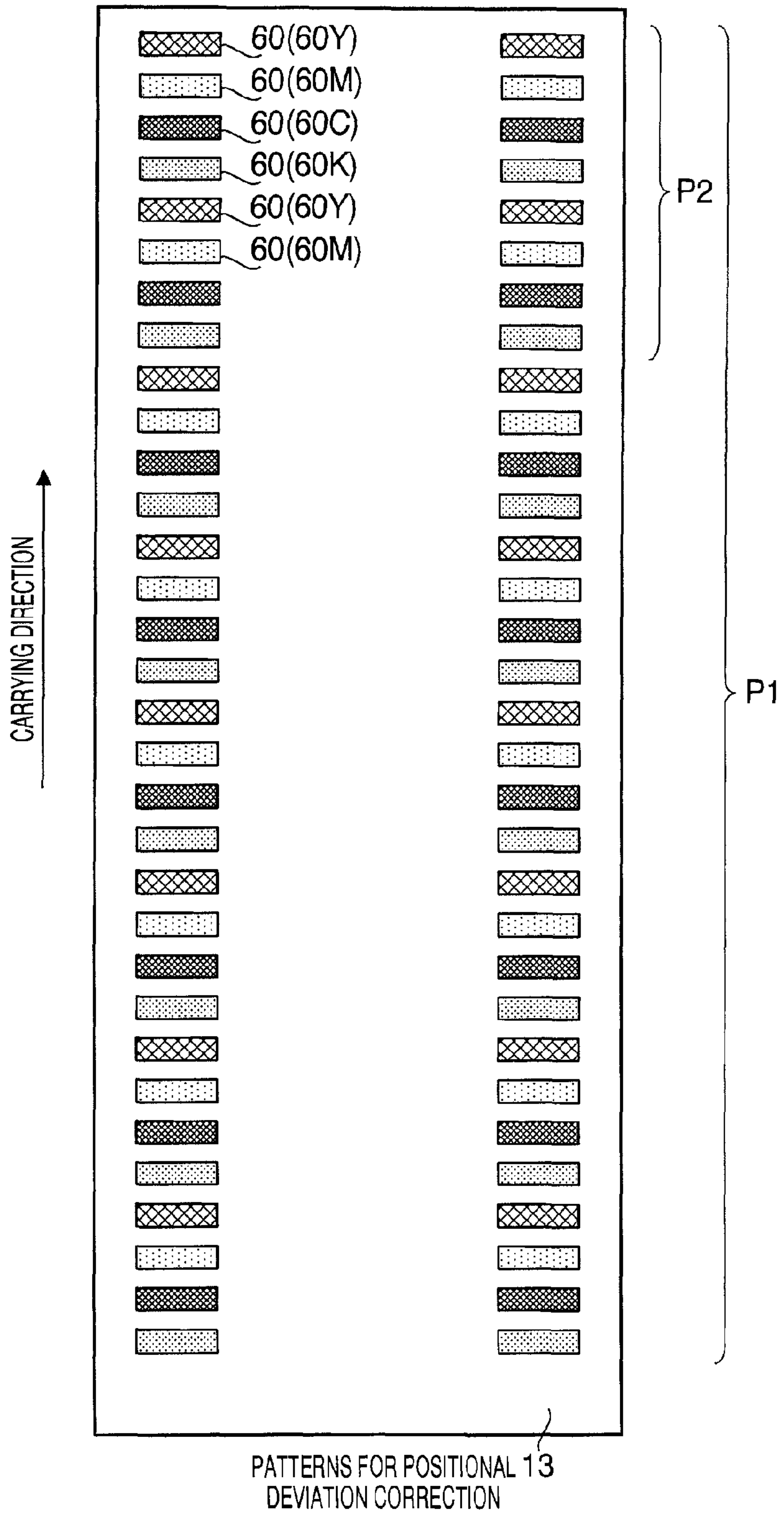
FIG. 5 is a schematic diagram exemplifying patterns for positional deviation correction in the embodiment according to one or more aspects of the present invention.
Figure 6:
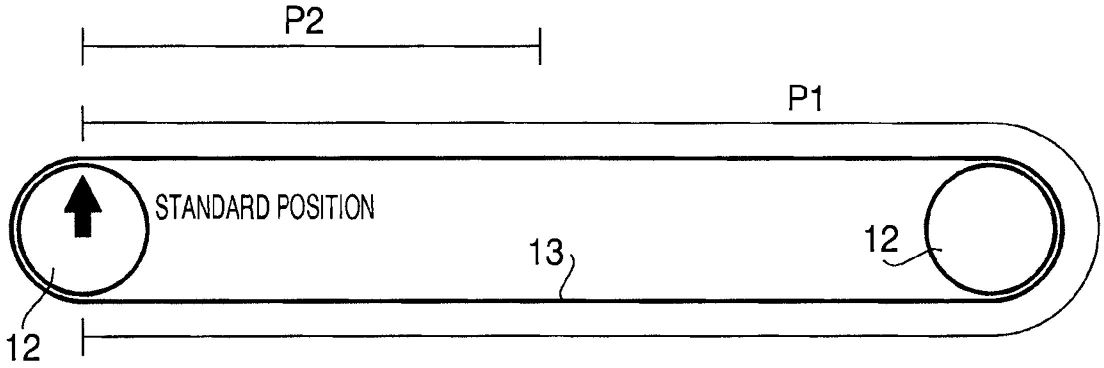
FIG. 6 is a schematic diagram illustrating ranges within which the patterns are formed in the embodiment according to one or more aspects of the present invention.

Next, the positional deviation correcting process to be executed by the printer 1 will be explained. FIG. 4 is a flowchart showing a procedure of the positional deviation correcting process. Further, FIG. 5 is a schematic diagram exemplifying patterns for the positional deviation correction. FIG. 6 is a schematic diagram illustrating respective ranges within which patterns are formed.

The positional deviation correcting process is executed, for instance, immediately after the printer 1 is powered ON or in the aforementioned printing process. When launching the positional deviation correcting process, the CPU 40 examines whether below-mentioned correlation values for the correction are stored on the EEPROM 43 (S201). When it is determined that correlation values are stored on the EEPROM 43 (S201: Yes), a pattern to be formed on the belt 13 for the correction is selected (S202).

In the positional deviation correcting process, either a long pattern P1 or a short pattern P2 is employed as a pattern for the correction. For example, as illustrated in FIG. 5, the long pattern P1 includes a plurality of marks 60 aligned in a row at each side of the belt 13. The marks 60 are aligned in a carrying direction of the sheet 3 at intervals of a predetermined distance. A plurality of groups are repeatedly provided, each of which includes four kinds of marks 60 formed with the four colors used in the process unit 20, respectively, in a predetermined order (for example, in an order of a yellow mark 60Y, a magenta mark 60M, a cyan mark 60C, and a black mark 60K). It is noted that the aforementioned pattern detecting sensors 15 are disposed to face the marks 60 of the respective rows.

As shown in FIG. 6, the long pattern P1 is formed within a range slightly shorter than a circuit of length on a circumferential surface of the belt 13. Meanwhile, the short pattern P2 has the same portion as a part of the long pattern P1 (which corresponds to a portion indicated with a reference character "P2" in FIG. 5). The short pattern P2 is formed within a range on the circumferential surface of the belt 13 about one fourth as long as the range of the long pattern P1. Also, the short pattern P2 includes the marks 60 about one fourth as many as those included in the pattern P1.

In the meantime, the CPU 40 selects either the long pattern P1 or the short pattern P2 based upon a predetermined condition. Specifically, for example, immediately after the printer 1 is powered ON, when the number of pages to be printed in the printing process is equal to or more than a predetermined number, or when the high image quality mode is active in the print settings, the long pattern P1 is selected. Unless the aforementioned conditions are satisfied, the short pattern P2 is selected.

In addition, when correlation values for the correction are not stored on the EEPROM 43 (S201: No) the CPU 40 examines whether active is the fast mode where the positional deviation correction is completed in a short time (S203). Here, if the fast mode is specified in the print settings included in the print job when the positional deviation correcting process is carried out in execution of the printing process, the present process advances with affirmative determination in S203 (S203: Yes). Meanwhile, unless the fast mode is specified, the present process advances with negative determination in S203 (S203: No).

When the fast mode is not specified (S203: No), or the long pattern P1 is selected in S202 (S202: Yes), a standard position is set as a start point to form each pattern P1 or P2 on the belt 13 (S204). It is noted that the RAM 42 stored thereon a standard position in previous pattern forming, and here a new standard position is set a predetermined distance away from the previous standard position in a circumferential direction.

Subsequently, the CPU 40 begins to draw a first yellow mark 60Y of the long pattern P1 from the standard point on the belt 13 with the process unit 20, and forms the long pattern P1 on the belt 13.

Next, the CPU 40 measures the long pattern P1 formed on the belt 13 with the pattern detecting sensors 15 (S206). More specifically, the CPU 40 compares output levels of the pattern detecting sensors 15 with predetermined thresholds to detect each mark 60. According to detection results, with respect to the four marks 60 of each group, positional deviations from the black mark 60K are determined for respective marks 60 of the other three colors. Then, an average value of the positional deviations determined for each color is defined as a measurement value. Here, two kinds of measurement values are obtained for each color, which includes a measurement value obtained by determining deviations of all marks 60 of the long pattern P1 and a measurement vale obtained by determining deviations of all marks 60 of the short pattern P2.

Next, a calculation is made to determine, for each color, a correlation value of the measurement value obtained based upon the long pattern P1 to the measurement value obtained based upon the short pattern P2, and the correlation value as determined for each color is stored on the EEPROM 43 (S207). Specifically, for example, regarding an image forming position for a color, when the measurement value obtained based upon the long pattern P1 is 5 mm, and the measurement value obtained based upon the short pattern P2 is 3 mm, a difference value +2 mm between both the measurement values is stored as a correlation value for the color. It is noted that, when a previously obtained correlation value has already been stored on the EEPROM 43, the previous correlation value is replaced with a new value.

Then, the CPU 40 stores on the EEPROM 43 a positional correction amount corresponding to the measurement value based upon the long pattern P1 (S208). Thereby, when an exposing operation is performed with the scanner unit 19 in the image forming operation, a writing position on each photoconductive drum 28 is corrected based upon the positional correction amount for each color. Thereafter, the present process is terminated. The long pattern P1 is formed over a range as long as a circuit of the belt 13, and the measurement value for each color is obtained as an average value of the positional deviations determined for each kind of mark 60 within the range of the long pattern P1. Therefore, even though the determined positional deviations periodically vary depending on positions on the belt 13, the measurement value can accurately calculated.

Meanwhile, when the short pattern P2 is selected in S202 (S202: No), or the fast mode is specified in the print settings in S203 (S203: Yes), the CPU 40 forms the short pattern P2 on the belt 13 with the standard position employed for forming the long pattern P1 as a standard position for the short pattern P2 (S209).

Subsequently, the CPU 40 detects a position of each mark 60 included in the short pattern P2 with the pattern detecting sensors 15. On the basis of the detected positions, in the same manner as described above, an average positional deviation from the black mark 60K is determined as a measurement value for the marks 60 of each of the other three colors (S210). Then, the CPU 40 examines whether a correlation value for each color as described above is stored on the EEPROM 43 (S211).

When a correlation value is stored (S211: Yes), the CPU 40 applies the correlation value for each color to the measurement value obtained for each color based upon the short pattern P2, and calculates a virtual measurement value presumed to be obtained based upon the long pattern P1 (S212). Specifically, for example, regarding an image forming position for a color, it is supposed that stored is a correlation value +2 mm as a difference value between the measurement value based upon the long pattern P1 and the measurement value based upon the short pattern P2. In this case, when the measurement value based upon the short pattern P2 is 4 mm, a value 6 mm obtained by adding the correlation value to the measurement value based upon the short pattern P2 is defined as the virtual measurement value corresponding to a measurement value based upon the long pattern P1.

Then, the CPU 40 stores, on the EEPROM 43, a positional correction amount corresponding to the virtual measurement value and corrects the image forming position (S213). Meanwhile, when a correlation value is not stored on the EEPROM 43 in S211 (S211: No), the present process advances to S213, in which the CPU 40 stores, on the EEPROM 43, a positional correction amount corresponding to the measurement value based upon the short pattern P2 and corrects the image forming position without using a correlation value. Thereafter, the positional deviation correcting process in the case where the short pattern P2 is selected is terminated. Since the short pattern P2 includes a smaller number of marks 60 formed within a shorter range on the belt 13 than the long pattern P1, the correction based upon the short pattern P2 needs a shorter time to complete than the long pattern P1.

(Effects of Embodiment)

As described above, according to the present embodiment, a selected one of the long pattern P1 and the short pattern P2 that include respective different number of marks 60 is formed on the belt 13. Then, based upon the positions of the marks 60 included in the selected pattern P1 or P2, a positional deviation of an image forming position is measured for each color, and the correction is performed with the positional deviation determined for each color. Thus, for instance, when the user gives higher priority to image quality, the user can use the long pattern P1 that provides more accurate correction. Meanwhile, when the user puts higher priority on an image forming speed, the user can use the short pattern P2 that provides shorter-time correction. Namely, it is possible to change an operation for the positional deviation correction depending on a situation.

Additionally, when the positional deviation of the image forming position is measured with the short pattern P2, a virtual measurement value, which is presumed to be obtained with the long pattern P1, is determined by applying the stored correlation value to the measurement value obtained based upon the short pattern P2. Then, the positional deviation correction is carried out with the virtual measurement value. Accordingly, it is possible to improve accuracy of the measurement based upon the short pattern P2 that may be lower than the accuracy of the measurement based upon the long pattern P1.

Further, according to the present embodiment, the short pattern P2 is a part of the long pattern P1. Additionally, when the long pattern P1 is formed, both the measurements based upon the long pattern P1 and the short pattern P2 are made, and a correlation value between both the measurement values is determined and stored. Therefore, it is efficient that the measurements based upon both the long pattern P1 and the short pattern P2 are executed at once, and it is possible to improve accuracy of the correlation value in comparison with a case where the measurements based upon the long pattern P1 and the short pattern P2 are separately performed.

Further, according to the present embodiment, when the correction is executed with the short pattern P2, the short pattern P2 is formed from the same standard position as that defined when the correlation value is determined and stored. Thus, it is possible to ensure the accuracy of the correction.

Further, according to the present embodiment, when a standard position on the belt 13 from which the long pattern P1 or the short pattern P2 is formed is newly set, the new standard position is set away from the previous standard position. Thereby, it is possible to prevent a pattern forming position from being intensively located, and thus to avoid a stain and/or a damage caused in a specific position on the belt 13.

Further, according to the present embodiment, for example, when caused is such a situation that it is impossible to maintain accuracy of an earlier-stored correlation value (e.g., when paper jam is detected), the situation is detected and the correction based upon the earlier-stored correlation value is not performed (namely, the positional deviation correcting process advances with affirmative determination in S202 (S202: Yes), then performing the positional deviation correction with the long pattern P1) to avoid low-accuracy correction.

Further, according to the present embodiment, when the correction based upon the correlation value is prohibited (S202: Yes), it is possible to perform accurate correction with the long pattern P1. Meanwhile, when the user gives higher priority to fast correction, the short pattern P2 is specified by the user (S203: Yes), and the correction can be completed in a short time.

Furthermore, an appropriate one of the long pattern P1 and the short pattern P2 is specified depending on what is required for a print job inputted. Thereby, for example, in the case where high correction accuracy is required such as cases of high image quality printing and many pages to be printed, the correction is performed with the long pattern P1. Meanwhile, in the case where high correction accuracy is not required such as cases of low quality printing and monochrome printing, the correction is performed with the short pattern P2.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

(Modifications)

The number, the interval, and the shape of the marks included in each pattern may be modified as needed. In the aforementioned embodiment, one pattern is a part of the other pattern. However, one pattern may not be a part of the other pattern. In the aforementioned embodiment, each pattern is configured to determine positional deviations of images of respective colors in the sheet carrying direction (auxiliary scanning direction). However, a pattern may be configured to determine positional deviations of image of respective colors in a main scanning direction that is a direction perpendicular to the auxiliary scanning direction in the surface of the belt 13. Additionally, although two kinds of patterns are provided in the aforementioned embodiment, three or more kinds of patterns may be provided, and the patterns may be specified as needed.

In the aforementioned embodiment, the correlation value between the measurement values for two kinds of patterns represents a difference therebetween. However, a correlation value therebetween may be determined in accordance with a relational expression. For example, a ratio of the measurement values for two kinds of patterns may be stored as a correlation value. Then, later, by multiplying a measurement value obtained using one pattern by the ratio stored, a virtual measurement value may be determined as a measurement value presumed to be obtained using the other pattern.

In the aforementioned embodiment, the belt 13 is employed as a carrying body on which each pattern is formed. However, for example, in the image forming device provided with a transfer drum, a pattern may be formed on the transfer drum. Further, a pattern may be formed on a recording medium such as a sheet.

What is claimed is:

1. An image forming device, comprising:
- a sheet carrying body configured to carry a sheet thereon in a predetermined direction;
- a forming unit configured to form an image on one of the sheet carrying body and the sheet being carried on the sheet carrying body; and
- a control device configured to:
  - select a pattern to be formed on the sheet carrying body from among a plurality of kinds of patterns depending on an image forming condition, the plurality kinds of patterns including a first pattern and a second pattern, the first pattern including a plurality of marks aligned at intervals of a predetermined distance within a first range, the second pattern including a plurality of marks aligned at intervals of a predetermined distance within a second range shorter than the first range;

control the forming unit to form the selected pattern on the sheet carrying body;

determine a positional deviation of the image to be formed on the sheet by the forming unit, based upon the pattern formed on the sheet carrying body by the forming unit; and perform positional deviation correction for the image to be formed on the sheet based upon the determined positional deviation.

2. The image forming device according to claim 1, wherein the control device is further configured to:

when the second pattern is selected, determine a virtual deviation with a correlation between a positional deviation that has been previously determined based upon the first pattern and a positional deviation that has been previously determined based upon the second pattern, as well as with a positional deviation newly determined based upon the second pattern, the virtual deviation being a positional deviation presumed to be determined based upon the first pattern, perform the positional deviation correction based upon the determined virtual deviation, when the second pattern is selected.

3. The image forming device according to claim 2, wherein the first pattern includes the second pattern, wherein the control device is further configured to:

determines a first positional deviation based upon the first pattern and a second positional deviation based upon the second pattern included in the first pattern, when the first pattern is selected;

determine the correlation between the first positional deviation and the second positional deviation;

store the correlation; and determine the virtual deviation with the stored correlation, when the second pattern is selected.

4. The image forming device according to claim 3, wherein, when the second pattern is selected, the forming unit forms the second pattern in a position on the sheet carrying body that is identical to a position of the second pattern formed when the correlation has previously been stored.

5. The image forming device according to claim 2, wherein the control device is further configured to prohibit the positional deviation correction performed based upon the virtual deviation.

6. The image forming device according to claim 5, wherein the control device prohibits the positional deviation correction performed based upon the virtual deviation, when a predetermined status change is detected in the image forming device.

7. The image forming device according to claim 5, wherein the control device selects the first pattern, when the control device prohibits the positional deviation correction performed based upon the virtual deviation.

8. The image forming device according to claim 1, wherein the control device is further configured to set a position on the sheet carrying body, in which the selected pattern is formed, away from a previous position of the same pattern.

9. The image forming device according to claim 1, wherein the control device is further configured to identify a fast mode in which the positional deviation correction is performed to give priority to an image forming speed, and wherein the control device selects the second pattern when the fast mode is identified.

10. The image forming device according to claim 1, wherein the control device is further configured to receive a print job, wherein the control device selects one of the plurality of kinds of patterns depending on a requirement for the print job received.

11. The image forming device according to claim 1, wherein the image forming condition is a print setting.

12. The image forming device according to claim 11, wherein the print setting is one of a quality setting for indicating a desired quality of the image, a speed setting for indicating a desired speed to be used to form the image, and a number of sheets for indicating a desired number of sheets on which to form the image.

13. A method comprising:

a pattern selecting step of selecting, by an image forming device, a pattern to be formed on a sheet carrying body from among a plurality of kinds of patterns depending on an image forming condition, the plurality kinds of patterns including a first pattern and a second pattern, the first pattern including a plurality of marks aligned at intervals of a predetermined distance within a first range, the second pattern including a plurality of marks aligned at intervals of a predetermined distance within a second range shorter than the first range;

a forming step of forming the pattern selected in the pattern selecting step on the sheet carrying body of the image forming device;

a deviation determining step of determining a positional deviation of an image to be formed on the sheet, based upon the pattern formed on the sheet carrying body in the forming step; and a correcting step of performing positional deviation correction for the image to be formed on the sheet based upon the positional deviation determined in the deviation determining step.

14. The method of claim 13, wherein the image forming condition is a print setting.

15. The method of claim 14, wherein the print setting is one of a quality setting for indicating a desired quality of the image, a speed setting for indicating a desired speed to be used to form the image, and a number of sheets for indicating a desired number of sheets on which to form the image.

16. A non-transitory computer readable medium having computer executable instructions stored thereon, the instructions causing an image forming device, which includes a sheet carrying body configured to carry a sheet thereon in a predetermined direction, to perform:

a pattern selecting step of selecting a pattern to be formed on the sheet carrying body from among a plurality of kinds of patterns depending on an image forming condition, the plurality kinds of patterns including a first pattern and a second pattern, the first pattern including a plurality of marks aligned at intervals of a predetermined distance within a first range, the second pattern including a plurality of marks aligned at intervals of a predetermined distance within a second range shorter than the first range;

a forming step of forming the pattern selected in the pattern selecting step on the sheet carrying body;

a deviation determining step of determining a positional deviation of an image to be formed on the sheet, based upon the pattern formed on the sheet carrying body in the forming step; and a correcting step of performing positional deviation correction for the image to be formed on the sheet based upon the positional deviation determined in the deviation determining step.

17. The non-transitory computer readable medium of claim 16, wherein the image forming condition is a print setting.

18. The non-transitory computer readable medium of claim 17, wherein the print setting is one of a quality setting for indicating a desired quality of the image, a speed setting for indicating a desired speed to be used to form the image, and a number of sheets for indicating a desired number of sheets on which to form the image.

* * * * *